United States Patent
Laycock et al.

(10) Patent No.: US 9,951,893 B2
(45) Date of Patent: Apr. 24, 2018

(54) FLEXIBLE PIPE BODY AND METHOD OF PRODUCING SAME

(71) Applicant: GE Oil & Gas UK Limited, Nailsea, Bristol (GB)

(72) Inventors: Mark Anthony Laycock, Newcastle-upon-Tyne (GB); James Latto, Newcastle-upon-Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 64 days.

(21) Appl. No.: 15/031,702

(22) PCT Filed: Oct. 23, 2014

(86) PCT No.: PCT/GB2014/053163
§ 371 (c)(1),
(2) Date: Apr. 22, 2016

(87) PCT Pub. No.: WO2015/059479
PCT Pub. Date: Apr. 30, 2015

(65) Prior Publication Data
US 2016/0265695 A1    Sep. 15, 2016

(30) Foreign Application Priority Data

Oct. 25, 2013 (GB) .................................. 1318915.4
Oct. 28, 2013 (GB) .................................. 1318994.9

(51) Int. Cl.
*F16L 11/10*    (2006.01)
*B32B 1/08*    (2006.01)
(Continued)

(52) U.S. Cl.
CPC .......... *F16L 11/10* (2013.01); *B29C 35/0866* (2013.01); *B32B 1/08* (2013.01);
(Continued)

(58) Field of Classification Search
CPC ........ F16L 11/10; B29C 35/0866; B32B 7/02; B32B 27/16
(Continued)

(56) References Cited

U.S. PATENT DOCUMENTS 5,918,641 A    7/1999 Hardy et al.
6,701,969 B2 *  3/2004 Wilson ................ B29D 23/001
                                          138/134
(Continued)

FOREIGN PATENT DOCUMENTS

CA    2535503     8/2007
WO    WO2004/065092 A1    8/2004

OTHER PUBLICATIONS

International Search Report and Written Opinion of the International Searching Authority, dated Jan. 22, 2015, for corresponding International Application No. PCT/GB2014/053163, 10 pages.

*Primary Examiner* — Patrick F Brinson
(74) *Attorney, Agent, or Firm* — Klarquist Sparkman, LLP

(57) ABSTRACT

A flexible pipe comprising a tubular layer comprising a polymer that is crosslinked to a greater degree at an outer region of the tubular layer than at an inner region of the tubular layer, wherein the outer region is defined by the outer surface of the tubular layer to a depth of 5% of the total thickness of the tubular layer and the inner region is defined by the inner surface of the tubular layer to a depth of 5% of the total thickness of the tubular layer.

11 Claims, 2 Drawing Sheets

(51) Int. Cl.
*F16L 11/08* (2006.01)
*B32B 7/02* (2006.01)
*B32B 27/08* (2006.01)
*B32B 27/16* (2006.01)
*B32B 27/18* (2006.01)
*B32B 27/20* (2006.01)
*B32B 27/28* (2006.01)
*B32B 27/30* (2006.01)
*B32B 27/32* (2006.01)
*B32B 27/34* (2006.01)
*F16L 11/12* (2006.01)
*B29C 35/10* (2006.01)
*B29C 35/08* (2006.01)
*B32B 5/14* (2006.01)
*B29C 47/00* (2006.01)
*B29K 101/12* (2006.01)

(52) U.S. Cl.
CPC ............... *B32B 7/02* (2013.01); *B32B 27/08* (2013.01); *B32B 27/16* (2013.01); *B32B 27/18* (2013.01); *B32B 27/20* (2013.01); *B32B 27/285* (2013.01); *B32B 27/286* (2013.01); *B32B 27/304* (2013.01); *B32B 27/32* (2013.01); *B32B 27/322* (2013.01); *B32B 27/34* (2013.01); *F16L 11/087* (2013.01); *F16L 11/12* (2013.01); *B29C 35/10* (2013.01); *B29C 47/0026* (2013.01); *B29C 2035/0822* (2013.01); *B29C 2035/0855* (2013.01); *B29C 2035/0877* (2013.01); *B29K 2101/12* (2013.01); *B32B 5/145* (2013.01); *B32B 2250/24* (2013.01); *B32B 2262/101* (2013.01); *B32B 2264/101* (2013.01); *B32B 2264/102* (2013.01); *B32B 2264/104* (2013.01); *B32B 2270/00* (2013.01); *B32B 2307/54* (2013.01); *B32B 2307/7242* (2013.01); *B32B 2307/7265* (2013.01); *B32B 2597/00* (2013.01)

(58) Field of Classification Search
USPC .......................................... 138/118, 134, 135
See application file for complete search history.

(56) References Cited

U.S. PATENT DOCUMENTS

2006/0275572 A1   12/2006  Bonnet et al.
2008/0011377 A1*   1/2008  Van Hooren ....... B29C 35/0266
                                                  138/118

* cited by examiner

FLEXIBLE PIPE BODY AND METHOD OF PRODUCING SAME

CROSS REFERENCE TO RELATED APPLICATIONS

This is the U.S. National Stage of International Application No. PCT/GB2014/053163, filed Oct. 23, 2014, which in turn claims the benefit of and priority to United Kingdom Application Nos. GB1318915.4, filed Oct. 25, 2013 and GB1318994.9, filed Oct. 28, 2013.

The present invention relates to a flexible pipe and method of producing the same.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

Flexible pipe may also be used for shallow water applications (for example less than around 500 meters depth).

In flexible pipes there are often used polymer layers, such as polyethylene, polyamides and polyvinylidene fluoride (PVDF), which may be formed by extrusion. Most polymers will have a certain maximum allowable strain above which the risk of damage to the material is much greater. In flexible pipes where a polymer layer lies adjacent an armour layer (such as a polymer internal pressure sheath adjacent a metallic pressure armour layer), the polymer layer may be subjected to quite severe non-uniform, highly localised strain.

The application of internal pressure (i.e. pressure from within the bore) to the pipe produces radial expansion in all layers and this is when a polymer layer undergoes deformation. At high pressures, the resultant strain distribution within the polymer layer can be highly localised as the layer is pressed outwards against the armour layer. This is because the armour layer is usually formed from interlocking wires of certain cross section, and there are gaps between adjacent windings. This allows the polymer material to deform by local yielding which may result in the phenomenon of microcrazing or microcracking within the polymer layer. During any subsequent loading (such as the loading experienced during normal use in transporting production fluids) this microcrazing may then extend to form longer/deeper cracks throughout the polymer layer. This increases the risk of failure of the polymer layer and may ultimately lead to loss of pressure containment, having an adverse effect on the lifetime of a flexible pipe.

According to a first aspect of the present invention there is provided a flexible pipe comprising a tubular layer comprising a polymer that is crosslinked to a greater degree at an outer region of the tubular layer than at an inner region of the tubular layer, wherein the outer region is defined by the outer surface of the tubular layer to a depth of 5% of the total thickness of the tubular layer and the inner region is defined by the inner surface of the tubular layer to a depth of 5% of the total thickness of the tubular layer.

The polymer in a region defined by the outer surface of the tubular layer to a depth of x %, wherein x is a value that is greater than 5% to less than 50% of the total thickness of the tubular layer, may also be crosslinked to a greater degree than polymer in a region defined by the inner surface of the tubular layer to a depth of x % of the total thickness of the tubular layer. In one embodiment, x may be 10 to 40% of the total thickness of the tubular layer, for example, 20 to 30% of the total thickness of the tubular layer. In one embodiment, as well as polymer in the outer region being crosslinked to a greater degree than polymer in the inner region, the polymer in a first region is also crosslinked to a greater degree than polymer in a second region, where the first region is defined by the outer surface of the tubular layer to a depth of up to 30% of the total thickness of the tubular layer and the second region is defined by the inner surface of the tubular layer to a depth of up to 30% of the total thickness of the tubular layer.

According to a second aspect of the present invention there is provided a method for the production of a flexible pipe as described above, said method comprising:
 a. extruding a tubular layer comprising a polymer, and
 b. crosslinking the polymer to a greater degree at the outer region of the tubular layer than at the inner region of the tubular layer.

According to a third aspect of the present invention, there is provided a flexible pipe comprising a tubular layer that comprises a polymer, wherein the outer surface of the tubular layer is treated to selectively increase the elastic modulus of the polymer adjacent the outer surface of the tubular layer relative to the elastic modulus of polymer adjacent the inner surface of the tubular layer. Preferably, the outer surface of the tubular layer is treated by crosslinking.

In a preferred embodiment, the polymer is crosslinked to a greater degree at the outer region of the tubular layer than at an inner region of the tubular layer, such that there is a general decrease (e.g. step or gradual) between the outer region and the inner region. In one embodiment, there is a general decrease (e.g. step or gradual) in the degree of crosslinking from the outer surface of the tubular layer to the inner surface of the tubular layer. Advantageously, this selective crosslinking increases the elastic modulus at the outer region of the tubular layer relative to the inner region. By increasing the elastic modulus at an outer region relative to that of the inner region, the present inventors have found that the risk of microcrazing at the inner surface of the tubular layer may advantageously be reduced. This is surprising because the treatment increases the relative elastic modulus of a region opposite to where microcrazing would typically take place. Without wishing to be bound by any theory, it is believed that, by increasing the elastic modulus in the outer layer, it is possible to reduce the risk of the polymer flowing radially outward under pressure from the bore of the pipe (e.g. into the gaps of any surrounding armour layer). This, in turn, is believed to reduce localised strain within the tubular layer, reducing the risk of microcrazing.

In one embodiment, the polymer in the outer region of the tubular layer is crosslinked to a greater degree than the polymer in the inner region by exposing the outer surface of the tubular layer to a source of radiation (e.g. e-beam). Optionally, the time and intensity of the exposure may be adjusted to control the extent of crosslinking within the tubular layer, such that a greater degree of crosslinking is achieved in the outer region relative to the inner layer. For example, the irradiating step may be controlled, such that the degree of crosslinking generally decreases from the outer region of the tubular layer to the inner region of the tubular layer. Crosslinking can provide a convenient and effective method of increasing the elastic modulus of the outer region relative to the inner region. In one embodiment, the polymer at the inner region or adjacent the inner surface of the tubular layer is not crosslinked.

In one embodiment, the degree of crosslinking is determined by ISO 10147:2011. For example, to determine whether the degree of crosslinking is greater in the outer region relative to the inner region, polymer samples may be removed from the outer region. One sample may be removed from the volume defined by a pre-determined area on the outer surface of the tubular layer and a depth of 5% of the total thickness of the tubular layer. This sample may then be tested using ISO 10147:2011 to determine its gel content. This value can be compared with that of a correspondingly sized sample removed from the inner surface of the tubular layer.

In one embodiment, the polymer in the outer region is crosslinked to a degree that is at least 10% greater, preferably at least 20% greater, more preferably at least 50% greater, even more preferably at least 90% greater than polymer in the inner region. As described above, the degree of crosslinking may be determined from the polymer's gel content, for example, according to ISO 10147:2011. The degree of crosslinking in the outer region may be at least 50%, preferably, at least 60% gel content, while the degree of crosslinking in the inner region may be less than 40%, preferably less than 20%, for example, 0%.

In one embodiment, the polymer in the outer region has an elastic modulus that is greater, for example, at least 10% greater, preferably 10 to 50% greater, more preferably at least 20 to 30% greater than polymer in the inner region. Elastic modulus and tensile properties, including yield strength, elongation and ultimate strength/elongation may be determined using ASTM D638 or ISO 527 (Parts 1 & 2).

In one embodiment, the elastic modulus decreases from the outer region of the tubular layer to the inner region of the tubular layer.

In one embodiment, the elastic modulus decreases from the outer surface of the tubular layer to the inner surface of the tubular layer.

Preferably, the polymer of the tubular layer is crosslinked to a depth of at least 10% of the total thickness of the tubular layer (measured from the outer surface of the tubular layer). In one embodiment, the polymer is crosslinked to a depth of 10 to 100%, preferably 10 to 70%, and more preferably 10 to 30% of the total thickness of the tubular layer. There may be a general decrease in the degree of crosslinking across the crosslinked region of the tubular layer. In one embodiment, however, the degree of crosslinking across the crosslinked region is substantially constant. At least a region adjacent the inner surface of the tubular layer may be non-crosslinked or crosslinked to a lesser degree.

In one embodiment, the polymer is not crosslinked in a region defined by the inner surface of the tubular layer to a depth of up to 30% of the total thickness of the tubular layer. The remainder of the polymer may be crosslinked to a substantially uniform degree. Alternatively, the degree of crosslinking in the remainder of the polymer may generally decrease with increasing distance from the outer surface of the tubular layer.

In one embodiment, the degree of crosslinking in a first region defined by the outer surface of the tubular layer to a depth of up to 30% of the total thickness of the tubular layer is greater than the degree of crosslinking in a second region defined by the inner surface of the tubular layer to a depth of up to 30% of the total thickness of the tubular layer. The degree of crosslinking in the first region may be at least 50%, preferably, at least 60% gel content, while the degree of crosslinking in a second region may be less than 40%, preferably less than 20%, for example, 0%.

The crosslinking gradient can be ascertained by creating a stack of, for example, 3 or 4 tensile samples which may be subsequently irradiated to initiate crosslinking. The samples can then be tested in accordance to ASTM D638 or ISO 527 (Parts 1 & 2) to measure the tensile properties, including yield strength, elongation, ultimate strength/elongation and elastic modulus. The tested samples can additionally or alternatively be assessed using ISO 10147:2011 to determine the level of crosslinking.

In one embodiment, the tubular layer may effectively have an outer "skin" layer that has a higher elastic modulus than the remainder of the layer. In this skin layer, the elastic modulus may be 10-50% greater, preferably 10-25% greater than that of the non-crosslinked polymer. In one embodiment, the skin layer may be defined by the outer surface of the tubular layer to a depth of up to 30% of the thickness of the tubular layer. In one embodiment, it is preferable that the elastic modulus of the polymer in a region defined by the inner surface of the tubular layer to a depth of 30% of the total thickness of the tubular layer is substantially equal to the elastic modulus of the non-crosslinked polymer.

In one embodiment, the tubular layer has an outer "skin" layer where the polymer is crosslinked or crosslinked to a greater extent than in the remainder of the tubular layer. For example, the degree of crosslinking in the outer region is crosslinked to at least 50%, preferably, at least 60% gel content, while the degree of crosslinking in the inner region is less than 40%, preferably less than 20%, for example, 0%. In one embodiment, the skin layer may be defined by the outer surface of the tubular layer to a depth of up to 30% of the thickness of the tubular layer.

The tubular layer may have a thickness of at least 4 mm, preferably at least 6 mm, more preferably at least 8 mm. The tubular layer may have a thickness of less than 20 mm, preferably less than 15 mm.

Once crosslinked, the tubular layer desirably has an elastic modulus of 500 to 2000 MPa.

The tubular layer is formed from a polymer composition comprising a polymer. The polymer composition advantageously includes at least 70 weight % polymer, preferably at least 85 weight % polymer, more preferably at least 90 weight % polymer based on the total weight of the polymer composition.

Any suitable polymer may be employed. Suitable polymers include polyolefins (e.g. polyethylene and polypropylene), polyamides, polyphenylene sulphide (PPS), polyether ether ketone (PEEK) and fluoropolymers. Suitable polyamides include PA-11 and PA12, while suitable fluoropolymers include polyvinylidene fluoride (PVDF), copolymers of hexafluoropropylene and tetrafluoroethylene (FEP). Homopolymers and copolymers may be employed. Preferably, the polymer is polyethylene (e.g. HDPE) and/or PVDF. In a preferred embodiment, the tubular layer is formed from a single polymer composition. The polymer composition may include one polymer or a blend of two or more polymers. By blending the polymer with, for example, other polymer(s) and optional additives, it is possible to design a polymer composition with desired properties.

Suitable additives for use in the polymer composition include initiators, pigments, heat stabilisers, process stabilisers, metal deactivators, flame-retardants and/or reinforcement fillers. Suitable reinforcement fillers may include glass particles, glass fibres, mineral fibres, talcum, carbonates, mica, silicates, and/or metal particles. The total amount of additives may be less than 30% by weight, preferably less than 15% by weight of the polymer composition, more preferably less than 10% by weight of the polymer composition.

In one embodiment, crosslinking is performed by irradiating the tubular layer using electromagnetic radiation, such as e-beam radiation. For example, the outside surface of the tubular layer may be irradiated with e-beam radiation. The intensity and duration of the e.g. e-beam radiation may be controlled to selectively crosslink the polymer adjacent the outer surface to a greater degree than the polymer adjacent the inner surface of the polymer. In one embodiment, the intensity and duration of the radiation may be controlled to selectively crosslink the polymer in the outer region to a greater degree than the polymer in the inner region of the tubular layer.

It may also be possible to include a crosslinking agent in the polymer composition. The crosslinking agent may advantageously have an activation temperature that is above the temperature at which the polymer composition is extruded to form the tubular layer. By selecting a crosslinking agent with an activation temperature greater than the extrusion temperature, it is possible to avoid or reduce the risk of inducing crosslinking during the extrusion step. In one embodiment, the activation temperature of the crosslinking agent is in the region of 190 to 250° C., preferably 190 to 230° C.

Suitable crosslinking agents include peroxides. Specific examples include butylcumyl peroxide, 2,5-dimethyl-2,5-di (tert-butylperoxy)hexyne-3), 3,3,5,7,7-pentamethyl-1,2,4-trioxepane, hydroperoxide, 2,5-dimethyl hexane 2,5-di-t-butyl peroxide, bis(t-butylperoxy isopropyl)benzene, t-butyl cumyl peroxide, di-t-butyl peroxide, 2,5-dimethyl hexine-3 2,5-di-t-butyl peroxide and butylhydroperoxide.

Once the polymer composition is extruded to form the tubular layer, the tubular layer may be irradiated with electromagnetic radiation. Any suitable wavelength may be employed. For example, microwave or IR radiation may be used, particularly when thermal initiators, including the peroxides above are employed.

In certain embodiments, heat may also be applied in addition or as an alternative to the electromagnetic radiation to initiate the crosslinking step.

As mentioned above, the tubular layer may be formed of a single polymer composition, for example, as a single layer structure. As well as reducing manufacturing time and cost, such a single layer structure may address any concerns over possible failure modes that may be perceived to be present in multi-layer structures. By forming the layer from a single polymer composition, the risk of layer separation is eliminated. A single layer structure also eliminates any interface within the tubular layer and reduces the risk of permeated gas and fluid build-up which may lead to issues under rapid decompression.

Alternatively, the tubular layer may be formed of two or more sub-layers, wherein each sub-layer is formed of a different composition. For example, the compositions of the sub-layers may differ (e.g. only) in their crosslinking agent content. In one embodiment, the tubular layer is formed from a first sub-layer and a second sub-layer, wherein the first sub-layer is formed from a polymer composition having a greater amount of crosslinking agent than the second sub-layer. In this embodiment, the first sub-layer forms the outer region of the tubular layer, while the second sub-layer forms the inner region of the tubular layer. Preferably, the second sub-layer is formed from a composition that is devoid of crosslinking agent. Where the amount of crosslinking agent is greater in the outer region of the tubular layer than the inner region of the tubular layer, it is not necessary to control the time and intensity of any exposure to irradiation to control the extent of crosslinking. Instead, the greater concentration of crosslinking agent in the outer region ensures that a greater degree of crosslinking is achieved in the outer region relative to the inner layer.

In one embodiment, the extrusion and cross-linking steps are carried out in an in-line process, including passing the extruded tubular layer from the extruder through to a cross-linking zone to cross-link the polymer. During extrusion, the tubular layer may be extruded onto a carcass or a mandrel. The carcass or mandrel may, for example, be cooled to limit the extent of crosslinking in the inner region of the tube.

In one embodiment, the extruded tubular layer is not actively cooled prior to crosslinking. The crosslinked tubular layer may optionally be cooled after the crosslinking step.

As discussed above, the tubular layer forms part of a flexible pipe, preferably, a flexible offshore pipe e.g. for subsea applications. In one example, the tubular layer may form the liner or internal pressure sheath layer of a flexible offshore pipe. The tubular layer may optionally be supported by a carcass located in the interior of the tubular layer, if desired.

Preferably, the tubular layer is surrounded by one or more armour layers. In one embodiment, the tubular layer is surrounded by a pressure armour layer. The pressure armour layer may be formed from an elongate strip of carbon steel having a generally Z-shaped cross-sectional profile. The strip is formed from a wire rolling process to have corresponding male and female connector portions such that as the strip is wound over the polymeric layer adjacent windings interlock. When pressure is applied within the bore of the tubular layer, the tubular layer may press against the pressure armour layer. The polymer in the outer region of the tubular layer, however, has a relatively higher elastic modulus. Accordingly, it is more resistant to flow and the risk of creep into the gaps in the armour layer is reduced. This reduces the strain within the tubular layer, reducing the risk of microcrazing at the internal surface of the tubular layer. By increasing the elastic modulus of the outer region (e.g. by crosslinking), it may also be possible to improve the high temperature resistance of the flexible pipe. As the elastic modulus of the outer region of the tubular layer is preferably greater than that of e.g. the remainder of the layer, the outer layer is more resistant to softening than the remainder of the tubular layer upon exposure to high temperatures (e.g. 130 to 150 degrees C.). Thus, while the remainder of the tubular layer may soften at high temperatures, the outer region may remain relatively stiff. Advantageously, this may reduce the risk of creep and, ultimately, layer thinning. As a result the high temperature performance of the pipe may be improved. For example, the pipe may be suitable for use at temperatures above 100 degrees C., for example, from 130 to 170 degrees C.

As discussed above, the increased resistance to creep can also improve the high temperature performance of the pipe, as it reduces the risk of the thinning of the tubular layer upon exposure to high temperatures.

In a preferred embodiment, the flexible pipe comprises an armour layer surrounding the tubular layer, wherein the inner surface of the armour layer is provided with interstices. These interstices or gaps may be formed between adjacent windings of wire used to form the armour layer. In a preferred embodiment, the armour layer is in direct contact with the outer surface of the tubular layer.

Embodiments of the invention are further described hereinafter with reference to the accompanying drawings, in which.

In the drawings like reference numerals refer to like parts.

Figure 1:
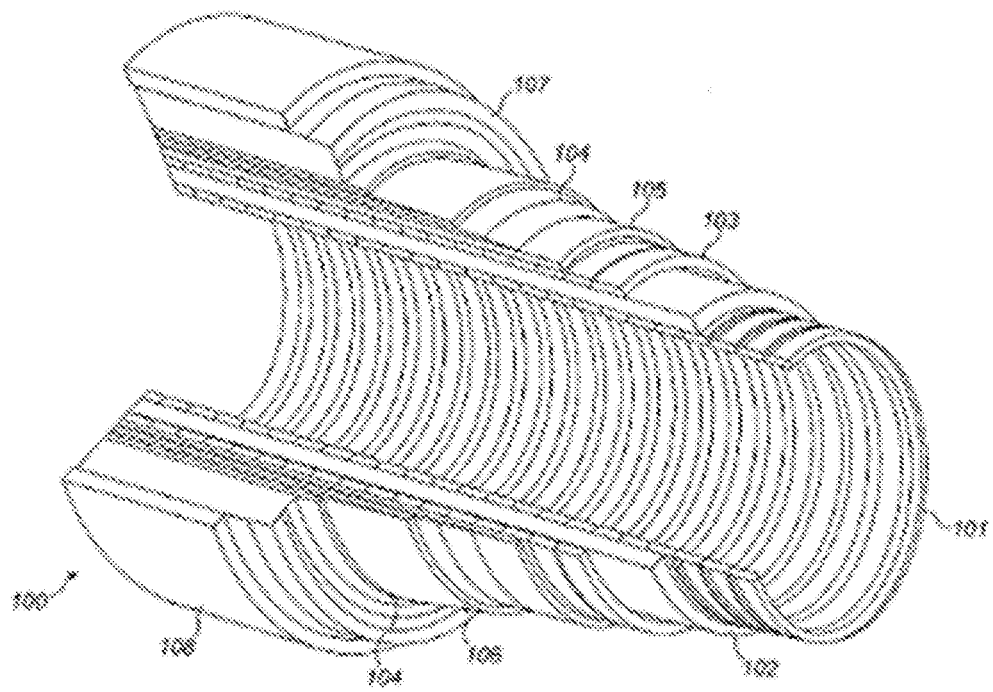
FIG. 1 illustrates a flexible pipe body.

For example, it will be understood that a flexible pipe is an assembly of a portion of a pipe body and one or more end fittings in each of which a respective end of the pipe body is terminated. FIG. 1 illustrates how pipe body 100 may be formed from a combination of layered materials that form a pressure-containing conduit. It is to be noted that the layer thicknesses are shown for illustrative purposes only.

As illustrated in FIG. 1, a pipe body may include an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. As is known in the technical field, there are 'smooth bore' operations (i.e. without a carcass) as well as 'rough bore' applications (with a carcass). The carcass layer may be formed from helically wrapped metallic tape having a shaped cross section to allow interlocking of adjacent wrapped tape portions.

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

In addition, and not shown in FIG. 1, there may also be included a wear layer between the carcass layer and internal pressure sheath. The wear (or sacrificial) layer may be a polymer layer (often extruded but sometimes in tape form) intended to provide a smoother surface or bed for the internal pressure sheath layer to be extruded onto than would be the case over the carcass layer, which may have undulations and gaps between wraps; this smoother wear layer surface may allow the internal pressure sheath layer to experience higher levels of general strain (extension) as a result of bending and pressure because what local stress concentrations remain are relatively small and insignificant. Without such a wear layer the extruded polymer internal pressure sheath may exhibit an undulating inner surface with protruding cusps of material that have naturally flowed into gaps in the carcass layer during the extrusion process; these cusps act as stress concentrators when the polymer is strained.

An optional pressure armour layer 103 is a structural layer that increases the resistance of the flexible pipe to internal and external pressure and mechanical crushing loads. The layer also structurally supports the internal pressure sheath, and typically consists of an interlocked construction of wires with a lay angle close to 90°.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

The internal pressure sheath 102 of the pipe body 100 of FIG. 1 may be formed of a tubular layer comprising a polymer, wherein the polymer is crosslinked such that the elastic modulus at an outer region of the tubular layer is greater than the elastic modulus at an inner region of the tubular layer.

Figure 2:
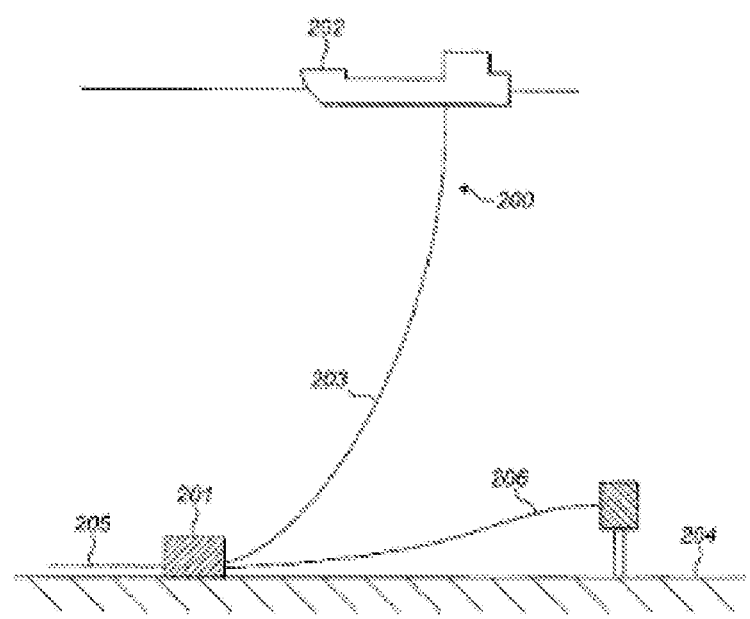
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
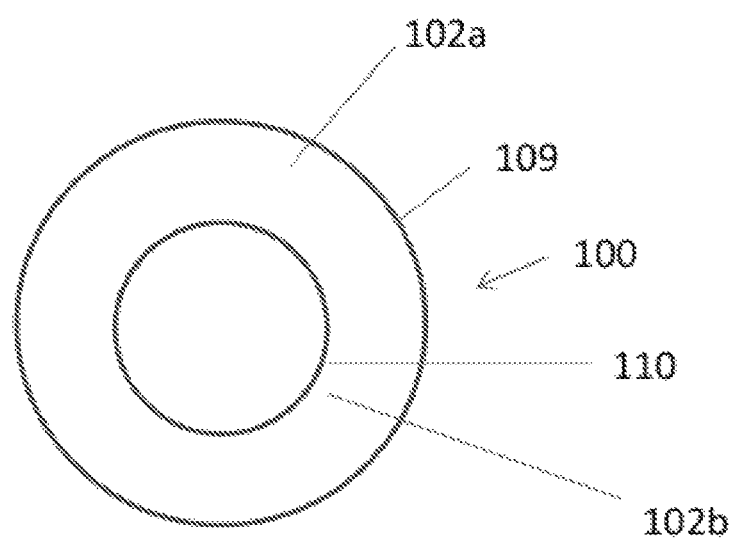
FIG. 3 illustrates a cross-section of a tubular layer that may be employed in a flexible body according to one embodiment of the present invention.

FIG. 3 illustrates a cross-section of a tubular layer 102 that may be employed in a flexible body 100 according to one embodiment of the present invention. The tubular layer comprises a polymer that is crosslinked to a greater degree at an outer region 102a of the tubular layer than at an inner region 102b of the tubular layer. The outer region is defined by the outer surface 109 of the tubular layer 102 to a depth of 5% of the total thickness of the tubular layer and the inner region 102b is defined by the inner surface 110 of the tubular layer to a depth of 5% of the total thickness of the tubular layer 102. The degree of crosslinking in the tubular layer decreases from the outer surface 109 to the inner surface 110 of the tubular layer. The polymer in a region defined by the inner surface 110 of the tubular layer to a thickness of up to 30% of the overall thickness of the tubular layer may not be crosslinked.

As a result of this crosslinking gradient, the elastic modulus at the outer region of the tubular layer is greater than that of the inner region. This makes the polymer adjacent the outer surface of the tubular layer 102 more resistant to creep. As a result, the polymer is less likely to flow radially outward under pressure from the bore of the pipe into the gaps of the optional pressure armour layer 103. Surprisingly, this reduces the risk of microcrazing at the inner surface of the tubular layer.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A flexible pipe comprising a tubular layer comprising a polymer that is crosslinked to a greater degree at an outer region of the tubular layer than at an inner region of the tubular layer, wherein the outer region is defined by the outer surface of the tubular layer to a depth of 5% of the total thickness of the tubular layer and the inner region is defined by the inner surface of the tubular layer to a depth of 5% of the total thickness of the tubular layer, wherein the degree of crosslinking in the outer region is at least 50% gel content and the degree of crosslinking in the inner region is less than 40% gel content, and wherein the flexible pipe additionally comprises an armour layer positioned around the tubular layer.

2. A pipe as claimed in claim 1, wherein the degree of crosslinking is determined by ISO 10147:2011.

3. A pipe as claimed in claim 1, wherein the elastic modulus of the polymer in the outer region is greater than the elastic modulus of the polymer in the inner region.

4. A pipe as claimed in claim 3, wherein the polymer in the outer region has an elastic modulus that is at least 10% greater than the polymer in the inner region.

5. A pipe as claimed in claim 1, wherein the tubular layer is formed from a single polymer composition.

6. A pipe as claimed in claim 1, wherein the tubular layer comprises an outer sub-layer and an inner sub-layer, wherein the outer sub-layer is formed from a first polymer composition and the inner sub-layer is formed from a second polymer composition, whereby the first polymer composition is crosslinked to a greater extent than the second polymer composition.

7. A pipe as claimed in claim 1, wherein the polymer in the inner region of the tubular layer is not crosslinked.

8. A pipe as claimed in claim 1, wherein the polymer in a region defined by the outer surface of the tubular layer to a depth of x % of the total thickness of the tubular layer, wherein x is a value that is greater than 5% to less than 50%, is crosslinked to a greater degree than the polymer in a region defined by the inner surface of the tubular layer to a depth of x % of the total thickness of the tubular layer.

9. A pipe as claimed in claim 1, wherein the degree of crosslinking decreases from the outer surface of the tubular later to the inner surface of the tubular layer.

10. A method for the production of a flexible pipe as claimed in claim 1, said method comprising:
   a. extruding a tubular layer comprising a polymer, and
   b. crosslinking the polymer to a greater degree at the outer region of the tubular layer than at the inner region of the tubular layer.

11. A method as claimed in claim 10, wherein crosslinking is performed by irradiating the outer surface using e-beam radiation.

* * * * *